(12) United States Patent
Glacet et al.

(10) Patent No.: US 9,132,594 B2
(45) Date of Patent: Sep. 15, 2015

(54) BI-LAYER ADHESIVE FOR LENS LAMINATION

(75) Inventors: Arnaud Glacet, Clearwater, FL (US); Peiqi Jiang, Tarpon Springs, FL (US); Bruce Keegan, Seminole, FL (US)

(73) Assignee: Essilor International (Compagnie Générale d'Optique), Charenton-le-Pont (FR)

( * ) Notice: Subject to any disclaimer, the term of this patent is extended or adjusted under 35 U.S.C. 154(b) by 1211 days.

(21) Appl. No.: 12/264,376

(22) Filed: Nov. 4, 2008

(65) Prior Publication Data
US 2010/0110567 A1 May 6, 2010

(51) Int. Cl.
*B29C 65/52* (2006.01)
*B29D 11/00* (2006.01)

(52) U.S. Cl.
CPC ....... *B29D 11/0073* (2013.01); *Y10T 156/1002* (2015.01); *Y10T 428/265* (2015.01); *Y10T 428/28* (2015.01); *Y10T 428/2878* (2015.01); *Y10T 428/2896* (2015.01); *Y10T 428/31551* (2015.04)

(58) Field of Classification Search
CPC ............................ B29D 11/0073; B29C 65/52
USPC ............ 428/1.1, 423; 159/990; 156/163, 214, 156/278, 156, 196, 212, 273.3, 273.7, 156/275.7; 351/159.73
See application file for complete search history.

(56) References Cited

U.S. PATENT DOCUMENTS

| | | | |
|---|---|---|---|
| 3,644,245 A | 2/1972 | Flanagan et al. |
| 4,032,489 A | 6/1977 | Haverstreng |
| 5,128,388 A | 7/1992 | Komori et al. |
| 5,190,825 A | 3/1993 | Arribart et al. |
| 5,316,791 A | 5/1994 | Farber et al. |
| 6,489,028 B1 | 12/2002 | Degand et al. |
| 6,503,631 B1 | 1/2003 | Faverolle et al. |
| 6,562,466 B2 | 5/2003 | Jiang et al. |
| 6,740,699 B2 | 5/2004 | Tardieu et al. |
| 6,770,710 B2 | 8/2004 | Robert et al. |
| 2006/0169407 A1 | 8/2006 | Jiang |
| 2006/0219347 A1 | 10/2006 | Begon et al. |

(Continued)

FOREIGN PATENT DOCUMENTS

| EP | 1161512 A1 | 12/2001 |
|---|---|---|
| EP | 1868798 A1 | 12/2007 |

(Continued)

OTHER PUBLICATIONS

Bayer Materialscience LLC. "Dispercoll U Polyurethane Dispersions". pp. 1-16. Jun. 2005 (19 Pages).

(Continued)

*Primary Examiner* — Tri V Nguyen
(74) *Attorney, Agent, or Firm* — Gardere Wynne Sewell LLP

(57) ABSTRACT

A method for laminating a film on to an optical article and a bi-layer adhesive for use in the method. The bi-layer adhesive includes a latex adhesive layer and an HMA layer sequentially disposed on the film and dried to form a solid layer of uniform thinness throughout to provide optical quality. Various types of films may be employed to provide an optical function. Following optional pre-treatment steps, the adhesives are coated on to the film. An optical hot press technique is used to deliver heat and pressure over a short period of time to form a functionally-enhanced optical article with high adhesive strength.

20 Claims, 1 Drawing Sheet

(56) References Cited

U.S. PATENT DOCUMENTS

| | | |
|---|---|---|
| 2007/0034322 A1 | 2/2007 | Glacet et al. |
| 2007/0035070 A1* | 2/2007 | Jiang et al. .................. 264/500 |
| 2007/0195262 A1 | 8/2007 | Mosse et al. |
| 2007/0195422 A1* | 8/2007 | Begon et al. .................. 359/642 |
| 2007/0270062 A1 | 11/2007 | Weber |
| 2008/0023137 A1 | 1/2008 | Jiang et al. |
| 2008/0094702 A1 | 4/2008 | Mizuno |
| 2009/0165932 A1* | 7/2009 | Biteau et al. .................. 156/163 |

FOREIGN PATENT DOCUMENTS

| | | |
|---|---|---|
| EP | 1917136 A1 | 5/2008 |
| FR | 2897693 | 8/2007 |
| WO | WO-02096521 A2 | 12/2002 |
| WO | WO03004255 A2 | 1/2003 |
| WO | WO2006013250 A1 | 2/2006 |
| WO | WO2006082105 A1 | 8/2006 |
| WO | WO2006105999 A1 | 10/2006 |
| WO | WO2007085910 A2 | 8/2007 |
| WO | WO2007096521 A2 | 8/2007 |
| WO | WO2007133208 A1 | 11/2007 |

OTHER PUBLICATIONS

Bayer Materialscience LLC. "Dispercol U 42". Dispercoll Product Datasheet. pp. 1-2. Edition Aug. 25, 2004. (2 Pages).

* cited by examiner

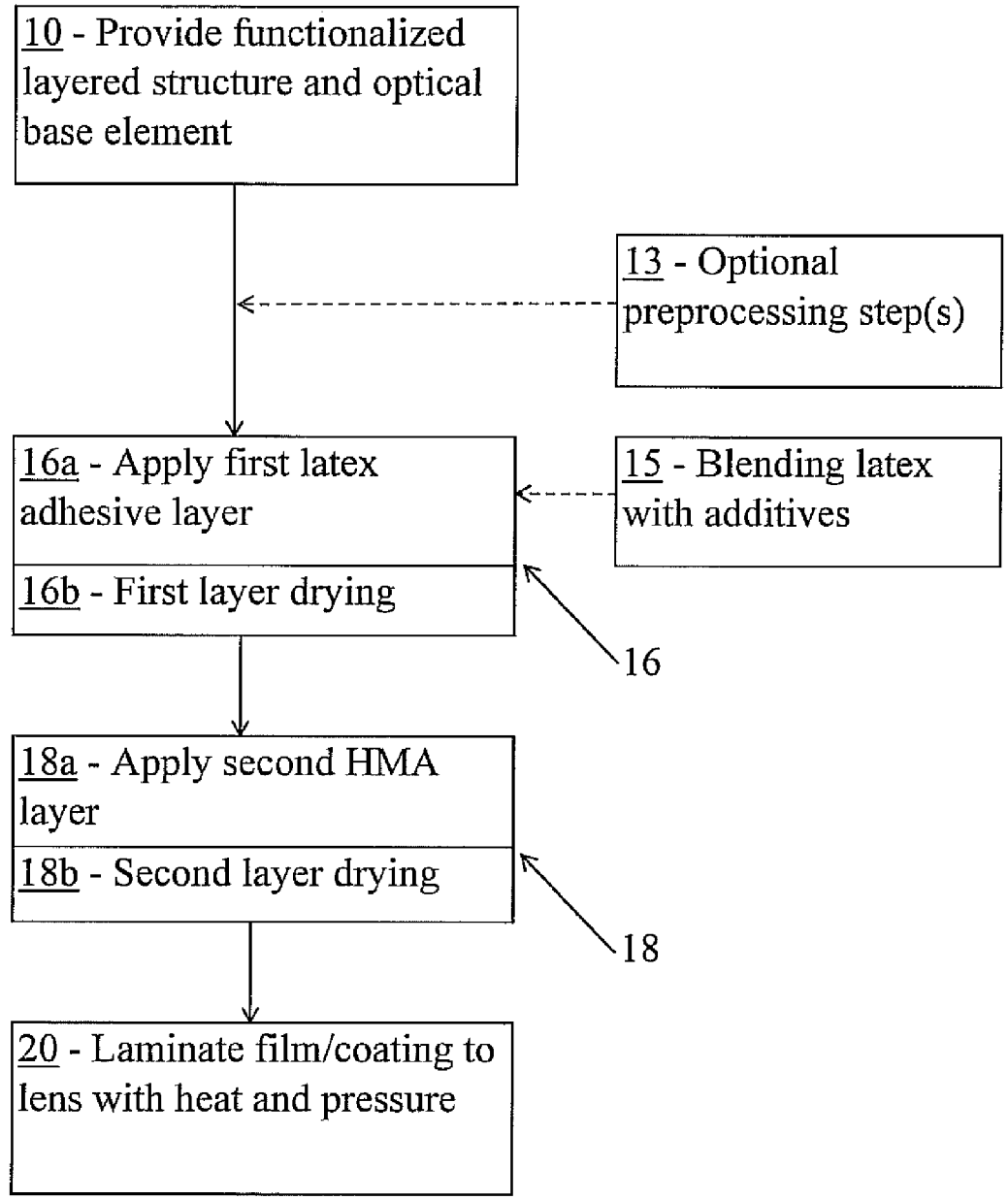

BI-LAYER ADHESIVE FOR LENS LAMINATION

BACKGROUND OF THE INVENTION

1. Field of the Invention

The invention relates to a method for laminating a functionalized layered structure to an optical base element with a bi-layer adhesive and the resulting functionalized optical element.

2. The Prior Art

Various films and coatings are combined with optical elements to enhance their performance. Adhesion between polarized films and plastic lenses has been a long standing problem within the industry. The selection of one adhesive always represents a compromise between ease of use, mechanical integrity and optical quality.

One approach is detailed in WO2006/082105 which employs a latex glue in a film transfer process. In EP 1868798 an HMA glue for a film transfer process is described. In WO2007/096521 a polarized film is laminated with a pressure sensitive adhesive. In a mechanical approach described in US2007/0195262, a complex support is used to warp the film during lamination to improve adhesion.

However, the techniques previously disclosed have a number of drawbacks, mainly due to low adhesion or low mechanical performance. Attempts to cure these defects have marginally improved adhesion strength with a loss of optical quality. Accordingly, there is a need to provide a method of adhesive application which compensates for the different material properties of the film and lens surface to provide high adhesive strength in a basic lamination process.

SUMMARY OF THE INVENTION

It is therefore an object of the present invention to improve both the mechanical and optical properties of laminated functionalized optical elements.

It is a further object to present two different adhesives and methods for applying same to provide a bi-layer adhesive that can be readily employed in a variety of optical hot press methods.

It is another object to apply the different adhesives in such a manner as to form a uniformly thin layer at optical quality.

These and other objects according to the invention are achieved by a functionalized optical element that includes an optical base element and a functionalized layered structure incorporating at least one functional layer which is glued directly to the optical base element to form a functionalized optical element. A bi-layer adhesive structure is disposed between the optical base element and the functionalized layered support. The bi-layer adhesive structure includes a layer of latex adhesive disposed on a surface of said functionalized layered structure and a layer of hot melt adhesive disposed between the latex layer and the optical base element to form a bi-layer adhesive that permanently retains the functionalized layered structure on the optical base element while maintaining optical quality.

The latex adhesive layer comprises a material selected from the group consisting of an acrylic latex, a (meth)acrylic latex, a polyurethane latex, a core/shell latex, and combinations thereof. The latex layer comprises a dry, solid layer of between 0.5 microns and 10 microns thick with a uniform thickness throughout to provide optical quality. In a preferred embodiment the latex layer is between 1.0 micron microns and 5.0 microns thick with a uniform thickness varying by less than 0.3 microns throughout to provide optical quality.

The hot melt adhesive (HMA) layer includes one or more of a UV curable HMA, a UV curable monomer, a thermal curable HMA, a thermal curable monomer, a polymer HMA, a thermoplastic polymer HMA, and a colloid. In a preferred embodiment, the HMA is a polyurethane HMA. The HMA layer comprises a dry, solid layer between 1.0 microns and 20 microns with a uniform thickness throughout to provide optical quality. In a preferred embodiment the HMA layer is between 1.5 microns and 10 microns with a uniform thickness varying by less than 0.3 microns throughout to provide optical quality.

Various types of functionalized layered structure includes one or more layers selected from the group consisting of: an optical function layer; an optical structured layer; a Fresnel lens structure; a performance function layer; a polarizing layer; a photochromic layer; a hard coat layer; a top coat layer; an anti-fog layer; an anti-smudge layer; an anti-reflective layer; and an anti-static layer. In a preferred embodiment, the functionalized layered structure includes one of a polarizing film, a TAC/PVA/TAC polarizing film and a PET polarizing film.

The optical base element is a thermoplastic or thermoset optical base element selected from the group consisting of a finished lens, a semi-finished lens, a PAL lens, an afocal lens, a plano lens, a unifocal lens, and a multifocal lens.

A preferred ensemble is an optical base element comprising a polycarbonate lens, and wherein the functionalized layered structure includes a polarizing film and wherein the latex adhesive is a polyurethane latex adhesive, and wherein the HMA is a polyurethane HMA, which collectively form a laminated polarized ophthalmic lens.

Another aspect of the invention includes a method for manufacturing a functionalized optical element comprising the following steps. An optical base element and a functionalized layered structure that include at least one functional layer is provided. A layer of latex adhesive is firstly coated onto one surface of said functionalized layered structure. A layer of hot-melt adhesive is secondly coated onto the dried latex adhesive layer to form a uniformly thin bi-layer adhesive lamina of optical quality. The functionalized layered structure is hot pressed against the optical base element with the second HMA coating layer in contact with a surface of the optical base element to form a functionalized optical element with high adhesive strength.

The functionalized layered structure is thermoformed to a curve that is close to the base curve of the optical base element, prior to lamination. An additional pre-treatment step may include surface treating the functionalized layered structure with a corona discharge.

The first coating step comprises spin coating a liquid polyurethane latex adhesive to a final dry thickness of between 0.5 microns and 10 microns. The second coating step comprises spin coating a liquid polyurethane HMA to a final dry thickness of between 1 micron and 20 microns. The laminated functionalized optical element may be exposed to heat and UV radiation.

In a preferred embodiment, the first coating step comprises spin coating a liquid polyurethane latex adhesive to a final dry thickness of between 1.0 microns and 5.0 microns; and wherein said second coating step comprises spin coating a liquid polyurethane HMA to a final dry thickness of between 1.5 microns and 10 microns to provide a bi-layer adhesive lamina at optical quality with a uniform thickness varying by less than 0.3 microns across the surface. In a preferred embodiment, the optical base element is a polycarbonate lens, and wherein the functionalized layered structure includes a polarizing film which collectively form a laminated polarized ophthalmic lens.

BRIEF DESCRIPTION OF THE DRAWING

The advantages, nature, and various additional features of the invention will appear more fully upon consideration of the illustrative embodiments now to be described in detail in connection with accompanying drawing:

FIG. 1 is a flowchart showing various steps according to an embodiment of the lamination method according to the invention.

DETAILED DESCRIPTION OF THE PREFERRED EMBODIMENTS

In the manufacture and customization of optical elements, the properties of the optical base element are frequently enhanced by laminating a functionalized layered structure onto a surface of the optical base element. Within the category of adhesive based lamination methods, various techniques have been proposed which include a single layer of thermal curable glue, UV curable glue, hot melt adhesives (HMA) or pressure sensitive adhesives (PSA). All of the prior art techniques have either optical or mechanical performance issues due to un-even thickness of the glue layer, a lack of good adhesion or low mechanical properties of the adhesive layer.

The principle of this invention is to use a bi-layer adhesive that is applied to the functionalized layered structure in stages before laminating to the lens. The first adhesive layer is latex which can bond strongly to the functionalized layered structure. The second adhesive layer is a hot melt adhesive (HMA) which can bond strongly to the lens. By using the combination of these two layers, the functionalized layered structure can be strongly bonded to the lens by a variety of methods in a very short time. The latex and HMA layers can be applied to the functionalized layered support in liquid form, for example, via spin coating or dip coating, to obtain a very thin, and uniformly thick adhesive layer of optical quality. To improve the adhesion between the latex and the functionalized layered support, optional pretreatment steps can be performed, such as corona or caustic treatment. The functionalized layered support may be thermoformed to a shape close to the base curve of the optical base element. In addition, the surface of the functionalized layered support may be subjected to a corona discharge treatment.

The bi-layer adhesive is useful in laminating to optical base elements made from plastic which could be thermoplastic or thermoset material. The base elements could be made from any suitable optical thermoset material including polyurethanes, CR-39, and high index polyurethanes, for example 1.67 and 1.74 materials. An exemplary list of plastics includes polycarbonate, polyamide, polyimide, polysulfone, copolymers of polyethyleneterephthalate and polycarbonate, polyolefin, homopolymers and copolymers of diethylene glycol bis(allylcarbonate), homopolymers and copolymers of (meth)acrylic monomers, homopolymers and copolymers of thio(meth)acrylic monomers, homopolymers and copolymers of urethane, homopolymers and copolymers of thiourethane, epoxy homopolymers and copolymers, and episulfur homopolymers and copolymers. In a preferred embodiment the optical base element comprises an injection molded thermoplastic lens, for example, polycarbonate.

The bi-layer adhesive is useful in laminating to either the convex or the concave side of optical base elements, for example, ophthalmic lenses. The lenses may be sunglasses, plano lenses, visors, or prescription (Rx) lenses. Such lenses may include finished lenses (F), semi-finished lenses (SF), progressive addition lenses (PAL), multifocal lenses, unifocal lenses and afocal lenses. The optical base element may be clear, tinted or dyed.

The functionalized layered support may comprise a film or coating that contributes an optical or performance function to the optical base element. In addition, the functionalized layered support may comprise a multi-functional film or coating that contributes at least one optical function, at least one performance function, or combinations thereof. Examples of optical functions include polarizing and photochromically enabling optical elements. Such functions are realized by polarized films, microstructured films as described for example in WO2006/013250, photochromic films and photochromic coatings. Polarizing materials are commercially available as polyethyleneterephthalate film (PET) or polyvinylacetate film (PVA) encapsulated by two cellulose films of two major types: cellulose triacetate (TAC) films and cellulose acetate butyrate (CAB) films. Other functionalized layer films could be PET which bear an antireflective coating, hard coat, or any other top-coat, such as an antistatic coating, anti-fog or anti-smudge coating, and a polarized coating or layers. In a preferred embodiment of the invention, a polarizing film is adhered to an optical base element to provide a polarized lens.

Examples of performance functions include hard coating, impact resistant, anti-fog, anti-static, anti-smudge and anti-reflective. Such functions are realized in the form of hard multi-coat (HMC) films which have several layers capped by a top coat film.

The functionalized layered element will have one surface designated for contact with the optical base element. Following any optional pre-treatment steps, this contact surface will receive a layer of latex adhesive, applied so as to achieve optical quality and good bond to the functionalized layered element. The various application processes shall be described in greater detail below. The application step involves drying the latex layer so that a thin, solid layer of latex remains. The dried latex layer shall be of sufficient purity to display color, transmission and clarity at a level consistent with optical quality ophthalmic lenses. In addition, the latex layer shall possess a uniform thickness across its surface. Uniform thickness refers to a layer which has a consistent thickness that varies by less than 0.01 microns to 0.3 microns. According to the invention, the latex layer shall be applied to a thickness of between about 0.5 and about 10 microns. In a preferred embodiment, the latex layer shall have a thickness of between 1.0 microns to 5.0 microns. For layers about 0.5 microns thick, the variation in thickness should be less than 0.05 microns. For layers about 5.0 microns thick, the variation in thickness should be less than 0.3 micron.

Latex materials meeting such requirements that may be used in the invention include polyurethane latex, acrylic latex, and core/shell latex. Examples include (meth)acrylic such as acrylic latexes commercialized under the name Acrylic latex A-639 by Zeneca, polyurethane latexes such as the latexes commercialized under the names W-213, W-240 and W-234 by Baxenden, and a polyurethane latex based on this commercialized product. Preferably, polyurethane latexes are utilized in the practice of the invention and more particularly such latexes as described in U.S. Pat. No. 5,316,791. Other preferred latexes are core/shell latexes such as those described in U.S. Pat. No. 6,503,631 and U.S. Pat. No. 6,489,028. Other preferred latexes are alkyl(meth)acrylates, such as butylacrylate and butyl(meth) acrylate.

The latex materials may optionally be blended with additives to adjust the rheological, mechanical or optical properties thereof. For example, a coupling agent may be added to the latex material to promote adhesion to the functionalized layered support. The latex material may include a cosmetic or photochromic dye or color dye or functional materials, such as anti-static materials, for example, as described in EP 1161512, U.S. Pat. No. 6,770,710 and U.S. Pat. No. 6,740, 699.

Second HMA Layer. After the latex layer is dry, solid and stable, a hot melt adhesive (HMA) material is applied over the latex layer, in a manner to achieve optical quality. The various application processes shall be described in greater detail below. The application step involves drying the HMA so that a thin, solid layer of HMA remains. The dried HMA layer shall be of sufficient purity to display color, transmission and clarity at a level consistent with optical quality ophthalmic lenses. In addition, the HMA layer shall possess a uniform thickness across its surface. Uniform thickness refers to a layer which has a consistent thickness that varies by less than 0.05 microns to 0.3 microns. According to the invention, the HMA layer shall be applied to a thickness of between about 1.0 and about 30 microns. In a preferred embodiment, the latex layer shall have a thickness of between 1.5 microns to 15 microns. For layers about 1.5 microns thick, the variation in thickness should be less than 0.3 microns. For layers about 10.0 microns thick, the variation in thickness should be less than 1.0 micron.

HMA materials meeting such requirements that may be used in the invention include polyurethane based HMA materials. These materials are characterized as aqueous anionic dispersions of high molecular weight polyurethane. One kind of HMA is commercially available from Bayer, such as Dispercoll® U 42 and KA-8758. The HMA materials may optionally be blended with additives to adjust the rheological, mechanical or optical properties thereof. For example, additives, such as colloid silica, can be added to the HMA formulation to facilitate crosslinking to improve the hardness and durability. A suitable colloid could be LUDOX® SM-30 colloidal silica, 30 wt. % suspension in water. The percentage of colloid in HMA could be in the range of 1-20 wt % and with a preferred range of 2-10 wt. %. The HMA materials in this invention can also be any known polymer for formulating a hot melt adhesive, but is preferably a thermoplastic polymer. Thus, an HMA polymer can be chosen amongst polyolefins, polyamides, polyurethanes, polyurethane-ureas, polyvinylpyrrolidones, polyesters, polyesteramides, poly(oxazolines) and poly(meth)acrylic systems. Suitable polyolefins are disclosed in particular U.S. Pat. No. 5,128,388. Preferred polyolefins are block thermoplastic elastomers, such as block elastomers comprising polystyrene blocks, polybutadiene blocks, polyisoprene blocks or ethylene-butylene copolymer blocks. Besides, any kinds of UV/thermal curable HMA or HMA blend with UV/thermal curable monomers as adhesive layers can be used in this invention as a second adhesive layer.

The bi-layer adhesive according to the invention comprises dry latex adhesive layer disposed between a functionalized layered structure and a dry polyurethane HMA layer. Under various processes that provide heat, pressure and time, the bi-layer adhesive operates to adhere the functionalized layered structure to an optical base element. The bi-layer adhesive comprises a uniformly thin layer at optical quality. We refer to this construct as a lamina, meaning an ultra thin layer composed of two different adhesives with uniform thickness thereby providing optical quality. The bi-layer adhesive provides a unique combination of materials that address disparate material properties between the functionalized layered structure and the optical base element. The latex layer typically exhibits good adhesion to the functionalized layered support, or to the optical base element in one surface alone during wet coating and to dry stage. However, it has poor adhesion to a lens when re-activated by heating and pressure after drying on the TAC film. The HMA layer, in contrast, has variable adhesive strength to a lens when re-activated after drying. But it does not have a good adhesion as the latex layer to the film during wet and dry stage. More particularly, the many HMAs have limited adhesive strength to the surface of the functionalized layered structure. Surprisingly, it was discovered that treating the functionalized layered structure with a latex adhesive primer layer, the HMA would now have high adhesive strength on both the lens and the functional film. Accordingly, the combination of the latex layer and the HMA layer overcomes the problems associated with adhering different materials together to provide a functionalized optical element with both optical quality and high mechanical strength.

As can be seen in the flowchart of FIG. 1, there are shown various steps for the manufacturing of a functionalized optical element. While one optional pre-processing step is shown, there may be two or more pre-processing steps involved in a particular embodiment of the invention. Likewise, other steps may be introduced at various stages and the claimed method is intended to cover those in a non-limiting fashion.

In step 10, there is provided a functionalized layered structure. The functionalized layered structure may have more than one layer. The functionalized layered support can include a combination of functional layers and non-functional layers. The types and categories of functional layers are described above in a non-limiting exemplary listing. An optical base element is also provided. The types and categories of optical base elements are described above in a non-limiting exemplary listing.

In step 13, optional pre-processing steps may be employed. The functionalized layered structure may be pre-processed to improve the adhesion of the latex adhesive thereto. For example, the facing surface may be exposed to a corona discharge treatment. Alternatively, or in addition, the functionalized layered structure may be thermoformed to a curve that is similar to the base curve of the facing surface of the optical base element. If thermoforming is employed, the functionalized layered support will be thermoformed to a curve within about 1 diopter of the base curve of the optical base element. Both thermoforming and an adhesion improvement step may be carried out, in any order.

Step 16 encompasses a latex adhesive application step to deposit the latex material onto the functionalized layered structure. Prior to application, an optional blending step 15 may be provided. The latex material may be combined with an additive to enhance rheological, mechanical or optical properties. For example, a coupling agent may be blended with the latex material in order to promote adhesion with the functionalized layered structure. A cosmetic dye or photochromic dye or a color dye may be blended with the latex material. Two or more compatible additives may be employed.

In step 16a, the latex adhesive is applied in a liquid form to the facing surface of the functionalized layered structure. The latex adhesive is then dried in step 16b to form a uniformly thin, solid layer of optical quality. The latex adhesive may be deposited by various application methods known within the optics industry to provide thin even coating layers, for example, spin coating or dip coating. The wet latex layer is subjected to a drying step 16b, which may include the introduction of heat. Drying may take place within a controlled atmosphere involving clean, dry air.

Step 18 encompasses an HMA application step to deposit an HMA material onto the dried latex layer. In step 18a, the HMA material is applied in a liquid form to the facing surface of the functionalized layered structure, on top of the latex layer. The HMA material is then dried 18b to form a uniformly thin, solid layer of optical quality. The HMA material may be deposited by various application methods known within the optics industry to provide thin even coating layers, for example, spin coating or dip coating. The wet HMA layer is subjected to a drying step 18b, which may include the introduction of heat. Drying may take place within a controlled atmosphere involving clean, dry air.

The dried bi-adhesive layer is then placed in contact with the facing surface of the optical base element, and subjected to a lamination step 20. Generally, lamination involves a combination of pressure and heat applied over a short period of time. It may also include exposing the hot pressed ensemble to UV radiation, to cure a UV curable adhesive, if present. Various systems and processes are known within the optics industry to provide a precise and uniform amount of pressure across optical surfaces. An exemplary listing of lamination systems that may be employed with the invention include the following. So-called "hot press" or "hot-air" systems may be used for lamination. An accumulator device having a lens support may be set-up to apply pressure, with the set-up then placed into an oven. An FST (Front Side Transfer) process may be used, as described in EP 1917136. A BST (Back Side Transfer) process may be used, as described in WO2003/004255. Other HMC film lamination systems may be used. A process, as described in WO2006/105999, may be used with the addition of heat. Injection molded lenses can be laminated in-mold, by placing the functionalized layered structure into an open mold opposite to of where the lens is retained, and then closing the mold in order to apply heat and pressure. We define Post Injection Press Coating (PIPC) (as described in WO2007/085910) as an in-mold lamination system utilizing heat and pressure from an injection mold to laminate a film onto a just molded lens. A basic laminating process would involve applying pressure greater than 10 psi, heating to at least 80 degrees C., and holding for at least about 2 to 5 minutes. Any one of these parameters could be adjusted higher or lower depending on the overall process conditions and the total amount of energy being introduced into the lamination.

The resulting functionalized optical element has good mechanical properties as gauged by the high adhesive strength of the functionalized layered support to the optical base element. Samples of the resulting functionalized optical element are able to withstand conventional lens processing and demanding adhesion tests without delaminating. To conduct such adhesion tests, known as the peel test, a 24.4 mm wide band was cut in the laminated film. The lens was solidly attached to a platform. A force was applied at 90 degrees to peel the band of film from the lens. The peeling speed was 2.54 mm/min. The force required to maintain the peeling speed was recorded. The resulting functionalized optical element had good optical properties due to the selection of adhesives and their precise application methods. Several examples of the inventive method are presented below along with comparative examples, which demonstrate the utility of the invention.

Examples 1 and 2

Adhesion comparison test on TAC/PVA/TAC film between a urethane latex, based on W-234 from Baxenden, and HMA-U42: TAC films were corona treated firstly, then the films were spin coated with either the urethane latex solution or HMA-U42 in the spin conditions of 450-500 rpm for 3-5 seconds and 1000-1500 rpm for 8-10 seconds, and then dried at 60 degree C. for 10-30 min. After drying and cooling, the adhesion behavior on each TAC film was measured by classic crosshatch tape method as shown in the following table. The results show that the latex had a better adhesion score than the HMA on a TAC film.

Adhesive test on TAC polarized film

| Ex. | Adhsives | Film | Treatment | Coating | Crosshatch Tape adhesion score |
|---|---|---|---|---|---|
| Ex. 1 | Latex | TAC | Corona | Spin and dry | 0 |
| Ex. 2 | HMA/U42 | TAC | Corona | Spin and dry | 5 |

*Crosshatch tape score 0 means perfect adhesion between Latex and TAC film and 5 means adhesion failure between U42 and TAC.

Example 3

A TAC polarized film (TAC/PVA/TAC) was first thermoformed to a curve close to the front side of a polycarbonate lens. The convex side of the TAC film was subjected to a corona discharge using Tantec equipment. A urethane latex adhesive, based on W-234 from Baxenden, was spin coated onto the treated film surface, and set to dry for 30 minutes at 60 degrees C. Next, an HMA solution of Dispercoll® U 42 was spin coated on top of the dried latex layer, and set to dry for 10 minutes at 60 degrees C. The dried bi-adhesive layer was then set against a polycarbonate lens, utilizing an accumulator device having a lens support and an inflatable silicon membrane. The pressure was slowly increased to 30 psi to achieve full contact across the entire surfaces of the film and lens. The accumulator set-up was place in an oven at 80 degrees C. for 30 minutes.

After lamination, the polarized optical element exhibited very strong adhesion between the film and the lens. No delamination occurred even after severe Rx surfacing, polishing and edging. The adhesion force between the laminated film and the lens was measured by Instron equipment, wherein the 90 degree pull test resulted in a 1.01 N/mm measurement with a pull speed of 2.45 mm/minutes. In the peel test, a force of 22.5 N was recorded to peel the film at 2.54 mm/min.

Comparative Example A

Example 3 was repeated except the TAC film was only coated with a single layer of latex adhesive. The resulting functionalized optical element displayed poor adhesion between the film and the lens. The film could be easily peeled off from the lens by hand. The adhesion was too low to be recorded by the peel test.

Comparative Example B

Example 3 was repeated except the TAC film was only coated with a single layer of HMA of U42. The resulting functionalized optical element was measured as having only 0.51 N/mm adhesion force between the film and the lens, which is 50% of the adhesion force demonstrated in Example 3 with the bi-adhesive layer. In the peel test a force of 11.5 N was recorded to peel the film at 2.54 mm/min. Again, this correlates to 50% of the adhesion force demonstrated in Example 3. These low adhesion values are comparable to those obtained with PSA, for example, as described in WO2007/096521.

Example 4

Example 3 was repeated except the lamination step was conducted by using a small hot press device with a pressure of 26 psi and heating at 90 degrees C. for 5 minutes. The resulting functionalized optical element had the same good adhesion between the functionalized layered structure and the optical base element. In the peel test a force of 20 N was recorded to peel the film at 2.54 mm/min.

Example 5

Example 4 was repeated except the lamination step was conducted by an in-mold lamination process (PIPC) right after a lens was injection molded. The mold was opened, with the lens being retained on one side. The polarized film was loaded into the other side, against the empty molding insert. The mold was re-clamped at considerable pressure whereby the residual mold heat allowed lamination to be completed within 1 to 2 minutes. In this in-mold lamination process, the molding pressure was about 7 tons and the temperature was set at 140 degrees C. The resulting functionalized optical element had the same good adhesion between the functionalized layered structure and the optical base element. In the peel test a force of 65 N was recorded to peel the film at 2.54 mm/min. The increase is attributed to a more intimate bonding resulting from the very higher temperature and pressure of the injection mold.

Example 6

Example 4 was repeated except the polar TAC film was replaced by a clear optical glade PET film and the lens was an Essilor high index polyurethane lens material (Thin & Light 1.6). The obtained lens had very good adhesion between the polyurethane lens and the PET film and the adhesion peel force was about 31 N at 2.54 mm/min speed. The lens did not show any delamination between the film and the lens during edging and polish processes.

Example 7

A bi-layer adhesive (a urethane latex, based on W-234 from Baxenden, and Dispercoll® KA-8758) can was also be used to adhere a top coat, and AR and HC coating layers onto the backside of the lens materials. Firstly, the top coat, and AR and HC coating layers were reversely coated on a polycarbonate carrier (7.0 base curve) which is described in the U.S. Pat. No. 6,562,466. Then a bi-layer adhesive was coated as described in Example 1. After that, the coated carrier was laminated onto a −2.00 Orma lens with the back curve of 6.5 under lamination conditions of 30 psi balloon pressure and 80 degrees C. for 4 minutes. After cool down, the carrier was removed to get a top/AR and HC coating layer transferred to the backside of the Orma lens. The adhesion between coating layers and the lens was very good with an adhesion score of 0 according to the Essilor standard crosshatch tape test.

Comparative Example C

Example 7 was repeated except that no latex adhesive layer was used between the HMC and the Top/AR/HC layer. The obtained lens showed that a good coating layer transferred but did not have a good adhesion score (score 5) according to the Essilor standard crosshatch tape test, which is considered as a coating adhesion failure.

Comparative Example D

Example 7 was repeated except that no HMA adhesive layer was used. The obtained lens did not show a good coating transfer and the adhesion score was 5 according to the Essilor standard crosshatch tape test, which is considered a coating adhesion failure.

Example 8

Example 7 was repeated except the pure KA-8758 HMA solution was replaced by a colloid contained in the KA-8758 HMA, which was made as a mixture of the KA-8758 HMA solution (93 wt. %) and the LUDOX® SM-30 colloidal silica, 30 wt. % suspension in H2O (7 wt. %). The obtained lens had the same good adhesion between the lens substrate and the AR and HC layer as found in Example 7. It also had a very good transparency. The most interesting result by adding the silica colloid was that the hardness of the HMA had been improved so that the surface of the lens was much harder as compared with Example 7. Therefore, the lens would not be easily scratched by a finger nail.

The preceding description and examples have proposed adhesive materials and methods for manufacturing functionally enhanced optical articles. Various types of films and coatings have been discussed which can be readily laminated onto optical base elements. The invention is useful in laminating sandwiched polarizing films onto ophthalmic lenses. The films and coatings are generally referred to as functionalized layered structures, which may undergo pre-treatment steps prior to adhesive application. The adhesive comprises a bi-layer adhesive structure that includes two different types of adhesive. A latex adhesive layer is disposed on the surface of the functionalized layered structure, and a HMA is disposed between the latex adhesive layer and the optical base element. The adhesive layers comprise a dry, solid layer of uniform thinness throughout to provide optical quality. Various dyes or other additive may be included in the adhesive formulations.

In one embodiment of the method, the functionalized layered support may be subject to corona discharge surface treatment and/or thermoforming. The adhesive layers are individually coated on to the functionalized layered support and allowed to dry, thereby forming a uniformly thin bi-layer adhesive lamina of optical quality. Spin-coating is advantageously employed as a coating technique. Various hot press techniques for optical applications may be used to deliver heat and pressure over a short period of time to laminate the functionalized layered structure to the optical base element to form a functionalized optical element with high adhesive strength.

Having described preferred embodiments for lens manufacturing, materials used therein for adhesives and films and methods for processing same (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for manufacturing a functionalized optical element comprising:
   providing an optical base element;
   providing a functionalized layered structure that includes at least one functional layer, such that the functionalized layered structure adheres to the optical base element, the providing including the steps of:
      applying a first coating as a layer of latex adhesive onto one exposed surface of the at least one functional layer;
      drying said first coating thereby forming a dried latex adhesive layer which bonds strongly to the at least one functional layer;
      applying a second coating as a layer of hot-melt adhesive (HMA) onto the dried latex adhesive layer to form a uniformly thin bi-layer adhesive lamina of optical quality, wherein a polymer for forming the HMA layer includes only a thermoplastic polymer;
      drying the second coating applied as the HMA layer before hot pressing,
      each of the first coating and the second coating comprising a different adhesive layer; and
   upon preparing the bi-layer adhesive lamina, hot pressing the functionalized layered structure against the optical base element with the bi-layer adhesive lamina therebetween, whereby the second coating formed as a dried HMA layer bonds with the optical base element,
   the bi-layer adhesive lamina forming a functionalized optical element,
   such that a high adhesive strength is thereby provided between the optical base element and the functionalized layered structure by using the latex adhesive and the HMA layer in combination to form the bi-layer adhesive lamina to address disparate material properties between the at least one functional layer and the optical base element.

2. The method of claim 1, wherein the optical base element has a base curve, and prior to applying said first coating, the method further includes:
   thermoforming the functionalized layered structure to a curve that is close to a base curve.

3. The method of claim 1, wherein prior to applying said first coating, the method further includes:
   surface treating the functionalized layered structure with a corona discharge.

4. The method of claim 1, wherein applying said first coating comprises spin coating a liquid polyurethane latex adhesive to a final dry thickness of between about 0.5 microns and about 10 microns.

5. The method of claim 1, wherein applying said second coating comprises spin coating a liquid polyurethane HMA to a final dry thickness of between 1 micron and 20 microns.

6. The method of claim 1, further including the following step:
   exposing the functionalized optical element to UV radiation.

7. The method of claim 1, wherein applying said first coating comprises spin coating a liquid polyurethane latex adhesive to a final dry thickness of between 1.0 microns and 5.0 microns; and wherein applying said second coating comprises spin coating a liquid polyurethane HMA to a final dry thickness of between 1.5 microns and 10 microns to provide a bi-layer adhesive lamina at optical quality with a uniform thickness varying by less than 0.3 microns.

8. The method of claim 7, wherein the functionalized layered structure includes a polarizing film.

9. The method of claim 7, wherein the optical base element is a thermoset optical base element selected from the group consisting of a finished lens, a semi-finished lens, a PAL lens, an afocal lens, a plano lens, a unifocal lens, and a multifocal lens.

10. The method of claim 1, wherein the functionalized layered structure includes one or more layers selected from the group consisting of:
    an optical function layer;
    an optical structured layer;
    a Fresnel lens structure;
    a performance function layer;
    a polarizing layer;
    a photochromic layer;
    a hard coat layer;
    a top coat layer;
    an anti-fog layer;
    an anti-smudge layer;
    an anti-reflective layer; and
    an anti-static layer.

11. The method of claim 1, wherein the optical base element is a thermoplastic optical base element selected from the group consisting of a finished lens, a semi-finished lens, a PAL lens, an afocal lens, a plano lens, a unifocal lens, and a multifocal lens.

12. The method of claim 1, wherein the optical base element is a polycarbonate lens, and wherein the functionalized layered structure includes a polarizing film which collectively form a laminated polarized ophthalmic lens.

13. The method of claim 1, wherein the HMA is selected from the group consisting of polyolefins, polystyrene block elastomers, polyisoprene block elastomers, ethylene-butylene copolymer block elastomers, polyamides, polyurethanes, polyurethane-ureas, polyvinylpyrrolidones, polyesters, polyesteramides, poly(oxazolines) and poly(meth) acrylic systems.

14. The method of claim 1, wherein the HMA is a polyurethane-based HMA.

15. The method of claim 1, wherein the HMA is UV curable.

16. The method of claim 1, wherein when the second coating has a final dry thickness of between 1.5 microns and 10 microns, there is a small variation in thickness that is less than 0.3 microns and 1.0 microns, respectively.

17. The method of claim 1, wherein drying said first coating includes an introduction of heat.

18. The method of claim 1, wherein drying the second coating includes an introduction of heat.

19. The method of claim 1, wherein hot pressing the functionalized layered structure against the optical base element with the bi-layer adhesive lamina therebetween further comprises exposing to UV radiation.

20. The method of claim 1, wherein the first coating forms a thermoset layer.

* * * * *